United States Patent [19]

Shimizu

[11] Patent Number: 4,568,155
[45] Date of Patent: Feb. 4, 1986

[54] WATERPROOF BINOCULARS

[75] Inventor: Fumio Shimizu, Minowa, Japan

[73] Assignee: Light Koki Co., Ltd., Nagano, Japan

[21] Appl. No.: 341,874

[22] Filed: Jan. 22, 1982

[30] Foreign Application Priority Data

Apr. 15, 1981 [JP] Japan .......................... 56-053243[U]

[51] Int. Cl.⁴ ........................ G02B 23/18; G02B 23/00
[52] U.S. Cl. .................................... 350/552; 350/589
[58] Field of Search ........................... 350/551–552, 350/582, 589, 545–550, 586–590

[56] References Cited

U.S. PATENT DOCUMENTS 3,985,421 10/1976 Beecher ............................... 350/552

FOREIGN PATENT DOCUMENTS 219300   1/1962  Austria ............................... 350/589
2841611  4/1979  Fed. Rep. of Germany ...... 350/552
50212    4/1980  Japan .................................. 350/552
777648   6/1957  United Kingdom ............... 350/589
1110554  4/1968  United Kingdom ............... 350/552

Primary Examiner—William H. Punter
Attorney, Agent, or Firm—Armstrong, Nikaido, Marmelstein & Kubovcik

[57] ABSTRACT

Waterproof binoculars of the central focus wheel-type having transfer bars coupled to focussing lens groups within the body tubes, with the transfer bars being simultaneously moved longitudinally by the co-action of a groove on each bar with a flange on a screw-threadingly mounted lead ring turned by a screw-threaded shaft. Each transfer bar is water-tightly sealed in its bore.

5 Claims, 3 Drawing Figures

WATERPROOF BINOCULARS

BACKGROUND OF THE INVENTION

The present invention relates to waterproof binoculars and, more specifically, central focus wheel-type waterproof binoculars.

Waterproof binoculars are known in the art which are of the individual focus wheel-type. That is, these binoculars employ individual focus wheels for individually focusing right and left body tubes of the binoculars, respectively.

Also known in the art are central focus wheel-type binoculars that have certain structure which permits the focusing of both the left and right body tubes simultaneously by one knob disposed along a central axis of the binoculars. However, it is difficult to transmit the rotation of a centrally placed knob to both right and left body tubes while insuring that the binoculars remain waterproof. Therefore, generally, waterproof binocular of the central focus wheel-type are not generally known.

OBJECTS AND SUMMARY OF THE INVENTION

It is an object of the present invention to provide a central focus wheel-type binoculars which are waterproof.

It is another object of the present invention to provide binoculars having a focusing mechanism which is easy to manufacture and simple to use.

In accordance with the above objects, the present invention includes waterproof binoculars comprising two body tubes, each having a coupling portion and an optical axis. The coupling portions are pivotally joined for movement about a longitudinal axis parallel to both optical axes. Each coupling portion has a step portion perpendicular to the longitudinal axis, with a bore in the step portion parallel to the axis. Each body tube houses at least one lens group which is shiftable along its optical axis for focusing. A pair of transfer bars are provided, each one being slidably mounted in one of the bores. Means are provided for water-tightly sealing each bar in its respective bore while permitting the movement of the bar in parallel with the longitudinal axis. Means are provided connecting one end of each bar to its respective lens group within the body tube for movement of the lens group along the optical axis. Rotatable means are aligned along the longitudinal axis for simultaneous moving both transfer bars longitudinally, thereby moving both at least one lens group along the optical axis for focusing the binoculars.

Each transfer bar can be provided with a groove in the other end thereof. The rotatable means can comprise a shaft mounted for only rotation having screw threads thereon, a knob fixed on the shaft and a lead ring having a radially extending flange and being screw-threadingly mounted on the shaft. The flange of the lead ring co-acts with the groove in each of the transfer bars to simultaneously move both bars longitudinally upon rotation of the knob. The knob can have a depending circumferential extension which houses and covers the lead ring and the portions of the transfer bars extending from the bores. The means for connecting the transfer bars to the shiftable lens groups can be a pin.

Consequently, each body tube can be totally sealed such that the only moving portion extending outside of the body tube is the transfer bars extending from the step portions of each coupling portion. Since a means for water-tightly sealing each bar in its respective bore is provided, the binoculars are essentially waterproof. The depending circumferential extension of the knob assists in keeping the rotatable means dry.

BRIEF DESCRIPTION OF THE DRAWINGS

The above and other objects and the attendant advantages of the present invention are readily apparent by reference to the following detailed description when considered in conjunction with the accompanying drawings wherein.

DETAILED DESCRIPTION OF A PREFERRED EMBODIMENT

Figure 1:
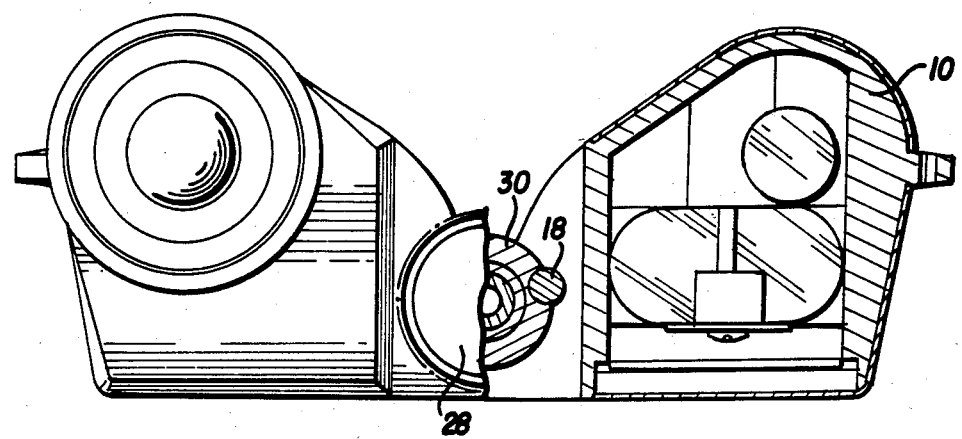
FIG. 1 is a partial cross-sectional, elevational view of binoculars in accordance with the present invention.
Figure 2:
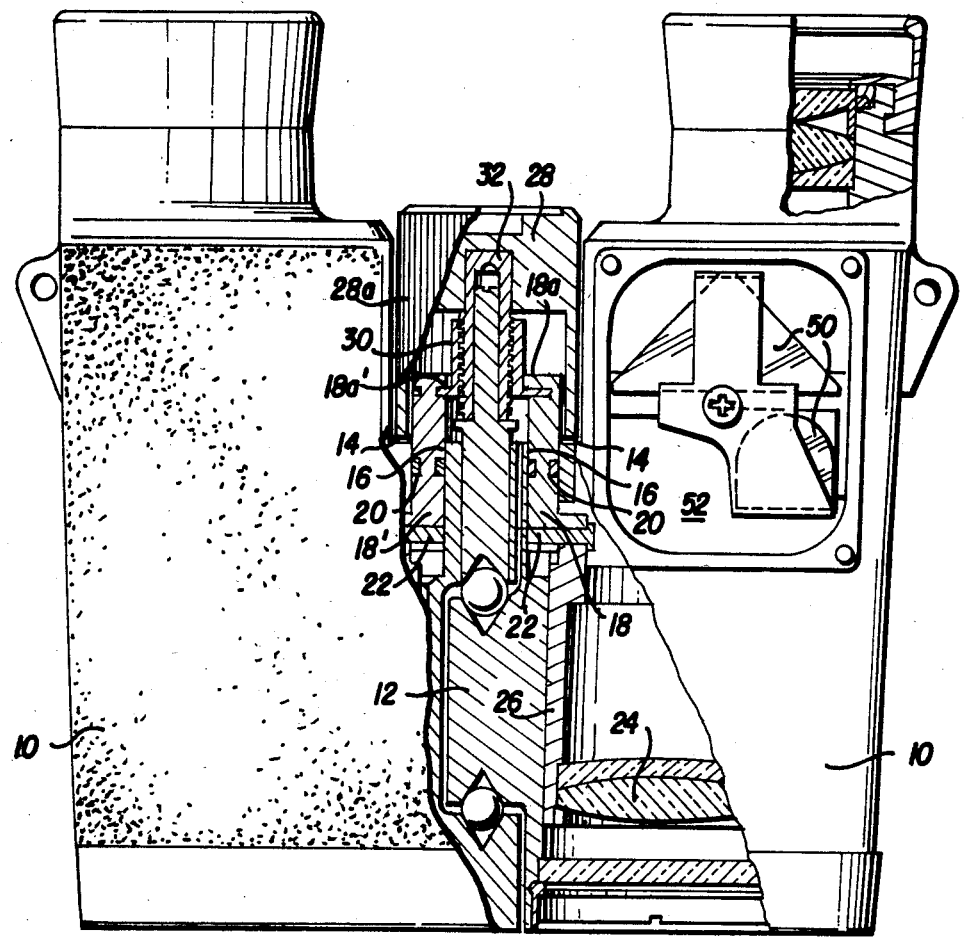
FIG. 2 is a partial cross-sectional top view of the present invention.

As can be plainly seen in FIG. 2, the present invention is a set of binoculars comprising a pair of body tubes 10. Each body tube has a coupling portion 12. The coupling portions 12 are pivotally joined for movement about a longitudinal, center axis. This axis is aligned along the optical axes of the two body tubes. Each body tube houses therein conventional ocular elements and prism elements. Additionally, each body tube has therein an object lens group 24 which functions as the transfer lens to permit focussing.

The opposite ends of the body tubes 10 are water-tightly sealed.

Each coupling portion 12 has a step portion 14 thereon which is a surface perpendicular to the longitudinal axis and the optical axes. Each step portion has a bore 16 therein in parallel with the longitudinal axis. A pair of transfer bars 18 and 18' are slidably mounted in each bore 16. Each transfer bar has thereon a means 20 for sealing the transfer bar water-tightly. This means 20 can be a conventional packing for an O-ring.

One end of each of the transfer bars 18, 18' is coupled to a frame 26 of the shiftable object lens group 24, preferably by a pin 22.

The opposite ends of each of the transfer bars 18, 18' is provided with a groove 18a, perpendicular to the longitudinal axis.

A shaft 32 is mounted for rotational motion only. The shaft 32 has screw threads on the outside surface thereof. A lead ring 30 is screw-threadedly mounted on the shaft. A knob 28 is fixedly mounted on the shaft. The lead ring 30 has a circular arc-shaped outer periphery or flange which co-acts with each of the grooves 18a, 18'a of the transfer bars 18, 18'.

The focussing mechanism of these binoculars is operated in the following manner:

When the knob 28 is turned, the shaft 32 turns and the lead ring 30 screw-threadingly mounted on the shaft 32 is shifted longitudinally along the axis. The co-action of the flange of the lead ring 30 and the grooves 18a, 18'a simultaneously moves both the transfer bars 18, 18' in the bores 16. This motion is transmitted to the lens object group 24 by the pin 22 and the frame 26, thereby enabling a user to focus the binoculars.

The rear ends of the transfer bars 18, 18' and the lead ring 30 with the shaft 32 can be covered by a depending, circumferential extension 28a of the knob 28. Thus, the rotatable means is free from being drenched by rain or the like.

Figure 3:
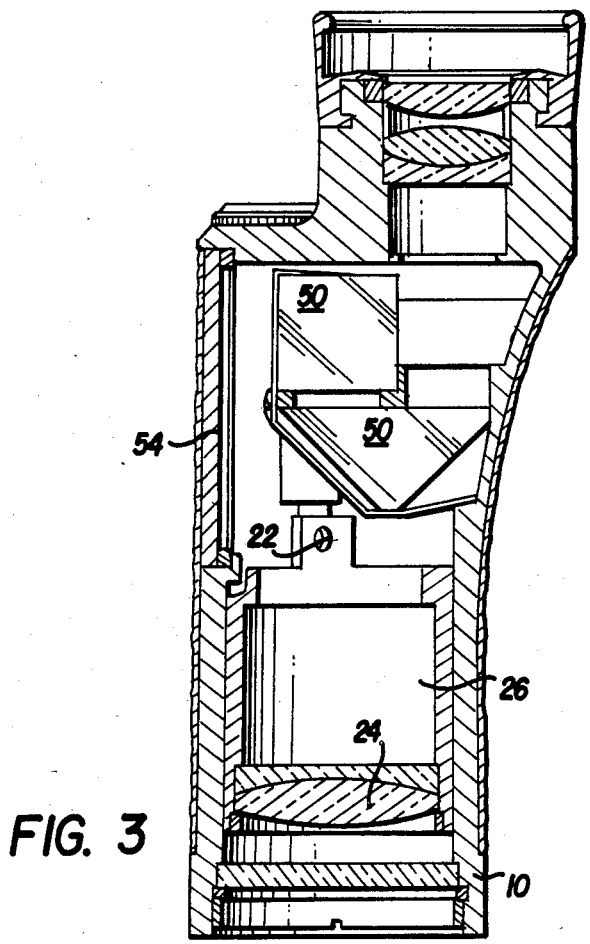
FIG. 3 is a cross-sectional, plan view of the present invention.

The foregoing construction yields the following benefits:

Since both optical openings in each body tube 10 are sealed and only one additional hole 16 is provided and since each transfer bar 18, 18' has a sealing means 20 thereon, the body tubes can be easily constructed in a waterproof fashion, even though the binoculars are of the central focus wheel-type. Further, this construction enables another substantial benefit in that each body tube can be manufactured by integral molding by the use of die-casting and the like. If this is desired, only the bore 16 and one slot for the passage of the pin need to be cast into the body, together with one assembly opening 52. The assembly opening can be machined into the body tube. In this manner, the body tubes do not need to be manufactured by coupling a plurality of separate individual parts, as is conventional in the art, and the elements 28, 32, 30, 20, and 18 can be a preassembled unit. The assembly of the internals of the binoculars can be easily performed. For example, if the opening 52 is sufficiently large, the prism 50 can be mounted therethrough after connection of the frame 26 to the appropriate transfer bar. The opening 52 can be simply and easily water-tightly closed by a lid 54 as shown in FIG. 3. This method is particularly effective in the poro-type prism binoculars which carry rather large prisms.

As described in the foregoing, the present invention is a central focus wheel-type waterproof binocular which has conventionally been considered difficult to manufacture or produce and is of simple construction.

It is readily apparent that the above-described binoculars meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A compact easily-assembled center-focusing waterproofed binoculars of the poro-prism type, comprising:

two bodytubes, each having a coupling portion and an optical axis, both coupling portions being pivotably jointed for movement about a longitudinal axis parallel to both optical axes, each coupling portion having a step portion perpendicualr to the longitudinal axis and a bore in the step portion parallel to the longitudinal axis, each body tube housing at least one lens group shiftable along its optical axis for focusing;

a pair of transfer bars, each slidably mounted in one of the bores and having opposite ends;

means for water-tightly sealing each bar in its respective bore;

means connecting one end of the respective transfer bar to the respective lens group for movement of the lens group along the optical axis;

rotatable means aligned along the longitudinal axis moving both transfer bars simultaneously longitudinally, thereby moving the respective lens groups along the optical axes for focusing;

each bodytube having a side with an opening therein;

a relatively-large poro-type prism received through the opening and mounted in the bodytube after the respective transfer bar has been connected to its respective lens group; and water-tight means for closing the opening, said pair of transfer bars and said rotatable means being insertable as a preassembled unit into said binoculars.

2. The binoculars as claimed in claim 1 wherein each transfer bar has a groove in the other end thereof, and said rotatable means comprises a shaft mounted for only rotation and having screw threads thereon, a knob fixed on the shaft, and a lead ring having a radially extending flange and being screw-threadably mounted on the shaft, the flange co-acting with the groove in each transfer bar to simultaneously move both bars longitudinally upon rotation of the knob.

3. The binoculars as claimed in claim 2 wherein the knob has a depending circumferential extension which houses and covers the lead ring and portions of the transfer bars extending from the bores.

4. The binoculars as claimed in claim 1 wherein the means for connecting is a pin.

5. In a compact center-focussed waterproofed binoculars, the combination of a pair of non-rotatable transfer bars slidably received in respective bores formed in the binoculars, a pair of bodytubes, a shaftable lens group within each bodytube, each shiftable lens group including a frame, a pin connecting each frame to a respective transfer bar, and o-ring carried by each transfer bar within its respective bore, each transfer bar including an end portion extending beyond the bore and having a groove formed therein, an internally-threaded lead ring having a flange received in the respective grooves, an externally-threaded shaft received within the lead ring and supported for rotational movement only, a knob carried by the shaft, the knob having a depending circumferential extension covering the lead ring and the respective end portions of the transfer bars, each bodytube having an opening formed therein, a poro-type prism received through the opening and mounted in the bodytube after the transfer bar has been connected to its respective lens group, and a water-tight lid for closing the opening 5; said pair of transfer bars, said o-rings, said lead ring, said shaft and said knob being insertable as a preassembled unit into said binoculars.

* * * * *